(12) United States Patent
Dissing

(10) Patent No.: US 11,359,623 B2
(45) Date of Patent: Jun. 14, 2022

(54) PUMP CONTROL METHOD AND PRESSURE-BOOSTING DEVICE

(71) Applicant: GRUNDFOS HOLDING A/S, Bjerringbro (DK)

(72) Inventor: Torben Thorsager Dissing, Bjerringbro (DK)

(73) Assignee: GRUNDFOS HOLDING A/S, Bjerringbro (DK)

(*) Notice: Subject to any disclaimer, the term of this patent is extended or adjusted under 35 U.S.C. 154(b) by 420 days.

(21) Appl. No.: 15/293,768

(22) Filed: Oct. 14, 2016

(65) Prior Publication Data
US 2017/0108882 A1 Apr. 20, 2017

(30) Foreign Application Priority Data

Oct. 16, 2015 (EP) .................................... 15190085

(51) Int. Cl.
| | |
|---|---|
| *F04B 49/06* | (2006.01) |
| *F04B 49/02* | (2006.01) |
| *F04B 49/08* | (2006.01) |
| *F04D 15/02* | (2006.01) |
| *G05D 16/20* | (2006.01) |

(52) U.S. Cl.
CPC ............ *F04B 49/065* (2013.01); *F04B 49/02* (2013.01); *F04B 49/08* (2013.01); *F04D 15/0209* (2013.01); *G05D 16/2066* (2013.01); *F04B 2205/05* (2013.01)

(58) Field of Classification Search
CPC .............................. F04B 17/03; F04B 49/022; F04B 49/06–065; F04B 49/08; F04B 49/20; F04B 51/00; F04B 2205/04–06; F04D 15/02–0236; F04D 15/0245; F04D 15/0254; F04D 15/0272; F04D 15/0281; F04D 15/0066; F04D 15/0077; F04D 15/0088; G05D 16/2066
USPC .................. 417/12, 19, 36, 38, 43, 44.2, 290
See application file for complete search history.

(56) References Cited

U.S. PATENT DOCUMENTS

| | | | | |
|---|---|---|---|---|
| 3,559,731 A | * | 2/1971 | Stafford .............. | E21B 47/0008 166/53 |
| 3,639,081 A | * | 2/1972 | Gray .................. | G05D 16/2073 417/12 |
| 3,746,471 A | * | 7/1973 | Gray ..................... | F04B 49/007 417/12 |

(Continued)

FOREIGN PATENT DOCUMENTS

| | | |
|---|---|---|
| DE | 10 24 362 B | 2/1958 |
| EP | 1 403 522 A1 | 3/2004 |

(Continued)

*Primary Examiner* — Charles G Freay
(74) *Attorney, Agent, or Firm* — McGlew and Tuttle, P.C.

(57) ABSTRACT

A pump control method for controlling at least one booster pump (4). The method includes switching on the booster pump when a booster pump outlet pressure (24) drops to a lower limit value (26), and switching off the booster pump when the booster pump outlet pressure (24) reaches an upper limit value (28). The lower limit value (26) is reduced in a case, in which the maximal outlet pressure (24*a*) which can be reached on operation of the booster pump (4) lies below the lower limit value (26). A pressure-boosting device is also provided with which the pump control method can be carried out.

18 Claims, 2 Drawing Sheets

(56) References Cited

U.S. PATENT DOCUMENTS

| | | | | |
|---|---|---|---|---|
| 3,794,789 | A * | 2/1974 | Bynum | F04D 13/16 200/82 R |
| 4,179,242 | A * | 12/1979 | Tateshita | G05D 9/12 417/12 |
| 4,290,735 | A * | 9/1981 | Sulko | E03B 5/02 417/12 |
| 4,527,953 | A * | 7/1985 | Baker | F04B 49/065 417/38 |
| 4,863,355 | A * | 9/1989 | Odagiri | F04B 41/02 417/12 |
| 5,064,347 | A * | 11/1991 | LaValley, Sr. | F04B 49/022 417/12 |
| 5,197,859 | A * | 3/1993 | Sift | F04B 49/022 417/19 |
| 5,244,351 | A * | 9/1993 | Arnette | F04D 15/0218 137/202 |
| 5,253,982 | A * | 10/1993 | Niemiec | F04B 11/0008 417/371 |
| 5,464,327 | A * | 11/1995 | Horwitz | E03B 5/02 417/12 |
| 5,601,413 | A * | 2/1997 | Langley | F04B 49/02 222/63 |
| 5,624,237 | A * | 4/1997 | Prescott | E03B 11/00 361/25 |
| 5,707,211 | A * | 1/1998 | Kochan, Sr. | E03B 5/00 417/12 |
| 7,901,190 | B2 * | 3/2011 | Gray | F04D 15/0209 417/141 |
| 8,393,352 | B2 * | 3/2013 | Porter-Coote | E03B 1/04 137/456 |
| 8,690,542 | B2 * | 4/2014 | Holmberg | F04D 15/0066 417/44.1 |
| 8,920,131 | B2 * | 12/2014 | Aspen | F04B 49/065 417/12 |
| 2002/0096219 | A1 * | 7/2002 | Frasure | F04D 15/0066 137/565.13 |
| 2002/0106280 | A1 * | 8/2002 | Beard | F04D 15/029 417/3 |
| 2007/0020108 | A1 * | 1/2007 | Walls | F04B 49/022 417/44.2 |
| 2007/0164128 | A1 * | 7/2007 | Kresge | B08B 3/026 239/104 |
| 2007/0275615 | A1 * | 11/2007 | Norton | A63B 41/12 441/90 |
| 2010/0168927 | A1 * | 7/2010 | Burrows | E03B 1/00 700/282 |
| 2011/0290331 | A1 * | 12/2011 | Burrows | E03B 7/02 137/14 |
| 2013/0183167 | A1 * | 7/2013 | Werner | F04B 49/022 417/53 |
| 2013/0289781 | A1 * | 10/2013 | Kallesoe | F04D 13/14 700/282 |
| 2014/0044560 | A1 * | 2/2014 | Komatsu | F04D 15/0066 417/19 |
| 2014/0255216 | A1 * | 9/2014 | Kallesoe | E03B 7/075 417/53 |
| 2014/0316591 | A1 * | 10/2014 | Karaki | G05D 7/0676 700/282 |
| 2015/0152860 | A1 * | 6/2015 | Darak | F04B 49/065 417/12 |
| 2015/0159657 | A1 * | 6/2015 | Roussel | F04D 15/0209 417/12 |
| 2017/0037842 | A1 * | 2/2017 | Ohkubo | F04B 49/08 |

FOREIGN PATENT DOCUMENTS

| | | | |
|---|---|---|---|
| JP | H10-318181 | * | 12/1998 |
| JP | H10 318181 A | | 12/1998 |
| JP | 2011 027118 A | | 2/2011 |
| WO | 2014/175248 A1 | | 10/2014 |

* cited by examiner

PUMP CONTROL METHOD AND PRESSURE-BOOSTING DEVICE

CROSS REFERENCE TO RELATED APPLICATIONS

This application claims the benefit of priority under 35 U.S.C. § 119 of European patent application 15 190 085.9 filed Oct. 16, 2015, the entire contents of which are incorporated herein by reference.

FIELD OF THE INVENTION

The invention relates to a pump control method for the control of at least one booster pump and to a pressure-boosting device.

BACKGROUND OF THE INVENTION

The starting point of the invention is formed by those devices, in which a fluid delivery medium at the exit side of the device is brought to a pressure level which is higher than the pressure level at the entry side of the device, by way of at least one booster pump. Such devices hereinafter indicated as pressure-boosting devices are applied for example in water supply mains in those cases, in which the mains pressure is not sufficient or is sufficient stable, in order to deliver the water to consumers which are situated at a high level, for example in high-rise flats or at locations on higher ground.

These pressure-boosting devices are typically designed such that a pressure level which is demanded from them at the exit side of the pressure-boosting device can be maintained in a certain pressure range. Accordingly, the booster pumps which are applied in such pressure-boosting devices are dimensioned in a manner such that under the assumption of a defined inlet pressure, they can provide a delivery pressure, with which the pressure level demanded at the exit side of the pressure-boosting device can be realized and can be held between a lower and an upper limit value. For this purpose, the booster pumps are always switched on when the pressure level at the exit side of the pressure-boosting device drops below the lower limit value, and switched off again when reaching the upper limit value. In the case that the inlet pressure of the booster pumps however drops to a value, at which the lower limit value for the outlet pressure demanded at the exit side of the booster pumps cannot be reached even with a maximal pump-difference-pressure, then the result of this is that the pressure-boosting devices continue to run in a temporally unlimited manner at maximal pump power, entailing a correspondingly high energy consumption, pump wear and heating of the delivered medium, without achieving the effect which is necessary regarding the pressure level which is to be provided at the exit side of the pressure-boosting device.

No significant advantages result even if, with this procedural manner, a maximal time duration for reaching the pressure level demanded at the exit side of the pressure-boosting device is set after switching on the booster pumps, and the booster pumps are switched off after completion of this time duration, since the booster pumps are immediately started anew when the pressure level demanded at the exit side of the booster pumps is not reached in the defined time duration, and the switch-on duration of the booster pumps is thus only insignificantly changed.

SUMMARY OF THE INVENTION

Against this background, it is the object of the invention, to provide a pump control method for the control of at least one booster pump, and a pressure-boosting device with at least one booster pump, with which significantly lower switch-on times of the at least one booster pump can be realized, in particular with a too low inlet pressure The part of this object with regard to the method is achieved by a pump control method according to the invention, whereas a pressure-boosting device with the according to another aspect of the invention solves the part of the object concerning the device. Advantageous further developments of the pump control method deduced from this disclosure including the following description as well as from the attached drawing.

The pump control method according to the invention serves for the control of at least one booster pump. Thus one or more booster pumps can be controlled with the pump control method, depending on the case of application, wherein hereinafter one only speaks of one booster pump, but this is also to be understood as several booster pumps interacting with one another and controlled by way of the pump control method.

With the pump control method according to the invention, the booster pump is switched on when its outlet pressure drops to a lower limit value, and is switched off when its outlet pressure reaches an upper limit value. The outlet pressure is hereby to be understood as the pressure which prevails at the exit or delivery side of the booster pump, wherein this outlet pressure in the case of a switched-on booster pump typically corresponds to the inlet pressure added with the delivery pressure of the booster pump. The upper and lower limit value of the outlet pressure hereby preferably indicates the region, in which the pressure at the exit side of the booster pump should be adhered to where possible.

The pump control method according to the invention is characterized in that the lower limit value for the outlet pressure is reduced in a case, in which the maximal outlet pressure which can be reached on operation of the booster pump lies below the lower limit value. Accordingly, the value for the lower limit value of the outlet pressure at the exit side of the booster pump is lowered, if per se, it is foreseeable that the maximal outlet pressure or delivery pressure of the pressure-boosting device which can be reached given a switched-on booster pump is not suitable for increasing the outlet pressure above this lower limit value. Although this measure does not affect the outlet pressure demanded at the exit side of the booster pump, however compared to the procedural manner which was common until now and with which a lower limit value for the outlet pressure is fixedly set, it has the advantage that the running time of the booster pump is significantly reduced compared to the methods which have been common until now, on account of the lowering of the lower limit value for the outlet pressure, which in turn entails a reduction of the energy consumption and wear of the booster pump as well as a reduced absorption of heat by the delivery medium in the booster pump.

The lower limit value is reduced preferably in dependence on the maximal outlet pressure within can be reached on operation of the booster pump, when the maximal outlet pressure which can be reached on operation of the booster pump lies below the lower limit value for the outlet pressure. Accordingly, with the pump control method according to the invention, the decision as to the extent in which the lower limit value for the outlet pressure is to be reduced, is preferably made in a manner depending on the maximal outlet pressure which can presently be realized at all given a switched-on booster pump.

In an advantageous further development of this procedural manner, i.e. with the reduction of the lower limit value, the lower limit value is reduced to a value which is lower than the maximal outlet pressure which can currently be achieved on operation of the booster pump, when the maximal outlet pressure which can be reached on operation of the booster pump lies below the lower limit value. The aim of this measure lies in the switching-on of the booster pump entailing an increase of the outlet pressure at all when the outlet pressure has dropped to the newly fixed lower limit value, at which increase the outlet pressure with the given conditions assumes the largest possible value, i.e. the maximal outlet pressure which can be achieved on operation of the booster pump.

With the pump control method according to the invention, one further advantageously envisages the lower limit value being reduced to a value which is lower than the maximal outlet pressure which can be currently reached on operation of the booster pump, by a predefined difference value. The magnitude of the difference value can hereby usefully be directed to the inlet pressure which presently prevails at the booster pump. The difference value can thus be fixed such that the lower limit value for the outlet pressure which is then newly set assumes at least the value of the inlet pressure presently prevailing at the booster pump, but meaningfully does not lie below this inlet pressure.

As soon as the inlet pressure of the booster pump is so large that the delivery pressure of the booster pump lies above the initially set lower limit value for the inlet pressure, a previously implemented lowering of this lower limit value is to be seen as disadvantageous, since this entails very large fluctuations of the outlet pressure due to the consumers. Above all, for this reason, with the pump control method according to the invention, one advantageously envisages resetting the lower limit value to a predefined starting value when the maximal outlet pressure which can be reached on operation of the booster pump lies above this predefined starting value and in particular lies above this predefined starting value by a predefined difference.

According to a further preferred development of the pump control method according to the invention, the booster pump is switched off after a defined time duration, in a case, in which the maximal pressure which can be reached on operation of the booster pump lies below the upper limit value. This means that when the delivery pressure of the booster pump lies below the upper limit value of the outlet pressure, the booster pump is only taken into operation in a fixed time interval, by which means the operational duration of the booster pump can be further advantageously reduced compared to the procedural manner common until now. The setting of a time duration until switching off the booster pump is moreover particularly advantageous if the lower limit value for the starting pressure has already been reduced, and in the time interval until switching off the booster pump, it is ascertained that a higher outlet pressure can hereinafter be realized on operation of the booster pump, so that the lower limit value for the outlet pressure can be increased again in a comparatively rapid manner.

With regard to the pump control method according to the invention, it is particularly important to know the maximal outlet pressure which can be achieved on operation of the booster pump, above all with regard to a reduction of the lower limit of the outlet pressure, which is to be carried out as the case may be. In this context, one advantageously envisages that the maximal outlet pressure which can be reached on operation of the booster pump being detected or computed on operation. A computation of the maximal outlet pressure which can be achieved on operation of the booster pump can hereby be usefully effected on the basis of the power data of the booster pump as well as the inlet pressure prevailing at the booster pump or by way of extrapolating the pressure course at the exit side of the booster pump. Moreover, a pressure sensor, with which the outlet pressure of the booster pump is measured at least during the operational duration of the booster pump, can be advantageously provided at the exit side of the booster pump, for detecting the maximal outlet pressure which can be reached on operation of the booster pump. Usefully, such a pressure sensor is simultaneously used for the continuous pressure monitoring for switching the booster pump on and off.

Apart from the previously described pump control method, a pressure-boosting device which is designed for carrying out the pump control method is also the subject-matter of the invention. This pressure-boosting device comprises at least one booster pump, with which it is preferably the case of a multi-stage centrifugal pump. Moreover, the pressure-boosting device has a control device. This control device comprises a memory, in which an upper and a lower limit value, which is to say an upper and a lower limit value for an outlet pressure prevailing at the exit side of the booster pump, are stored. The control device serves for the control of the booster pump, wherein it controls the booster pump in a manner such that it switches on the booster pump when its outlet pressure drops to the lower limit value, and switches it off when its outlet pressure reaches the upper limit value. With regard to the control device it is preferably the case of an electronic control device.

What is special about the pressure-boosting device according to the invention is the fact that the control device comprises an adaptation module for adapting the lower limit value for the outlet pressure, said adaptation module being configured to reduce the lower limit value and store the reduced and store lower limit value in the memory, in a case, in which the maximal outlet pressure which can be reached on operation of the booster pump lies below the lower limit value for the outlet pressure. The adaptation module is thus provided and configured, in order, when required, to change the lower limit value for the outlet pressure and which is stored in the memory, on the basis of the maximal outlet pressure which can be reached on operation of the booster pump, and to further lead this changed lower value for the outlet pressure to the memory for storage, or to store this value itself in the memory. The memory is usefully a write-read memory, in which a previously stored lower value for the outlet pressure can be overwritten by a new lower value for the outlet pressure which is adapted by the adaptation module, in order to being able to store the changed value for the outlet pressure in the memory.

The knowledge of the maximal outlet pressure which can be achieved on operation of the booster pump is a significant precondition for the lower value for the outlet pressure being able to be adapted by the adaptation module to the respectively prevailing operating conditions of the pressure-boosting device in a meaningful manner. Particularly for this purpose, the control device advantageously comprises a computation module which is configured to compute the maximal outlet pressure which can be reached on operation of the booster pump. With this computation module, it is the case of a part of the control device whose component architecture is of a nature such that at least the computation operations which are necessary for the computation of the maximal outlet pressure which can be reached on operation of the booster pump, can be carried out by it alone or in combination with suitable software. If these computation operations result in the fact that the maximal outlet pressure which can be achieved on operation of the booster pump will lie below the lower limit value for the outlet pressure and which is stored in the memory, then the adaptation module of the control device initiates the reduction of the lower limit value and accordingly its storage it in the memory. If the computation module however comes to the result that the maximal outlet pressure which can be achieved on operation of the booster pump lies above the lower limit for the outlet pressure and which is stored in the memory, then the lower limit value which is stored in the memory is retained or in a case, in which the lower limit value has already been lowered, the adaption module of the control device initiates the changing of the lower limit value again to the lower limit value initially stored in the memory.

The pressure-boosting device according to the invention is further advantageously provided with at least one pressure sensor which is arranged at the exit side of the at least one booster pump, which detects the outlet pressure and is signal-connected to the control device. Hereby, the pressure sensor and the control device are usefully configured for the temporal, complete detection of the outlet pressure prevailing at the exit side of the booster pump, so that the booster pump can be switched off directly on reaching the upper limit value for the outlet pressure and be switched on directly on reaching the lower limit value for the outlet pressure. Moreover, the pressure values detected by the pressure sensor, as the case may be, can form a computation basis for the computation of the maximal outlet pressure which can be achieved on operation of the booster pump, or the actually achievable outlet pressure can be measured.

According to a further preferred design of the pressure-boosting device according to the invention, the adaptation module is configured in a manner such that in the case, in which the maximal outlet pressure which can be reached on operation of the booster pump lies below the lower limit value, it reduces the lower limit value and in particular reduces it to a value lower than the achievable maximal outlet pressure. Hereby, the adaptation module via a signal connection between the adaptation module and the computation module usefully falls back on the value for the maximal outlet pressure which can be achieved on operation of the booster pump and which is determined by the computation module, or on a measured maximal outlet pressure.

The adaptation module is moreover preferably configured in a manner such that it resets the lower limit value to a predefined starting value stored in the memory of the control device and stores it in the memory of the control device, when the maximal outlet pressure which can be reached on operation of the booster pump lies above this predefined starting value and in particular lies above this predefined starting value by a predefined difference. In this case too, the adaptation module advantageously communicates with the computation module which determines the value of the maximal outlet pressure which can be achieved on operation of the booster pump, or with a pressure sensor which detects the value.

Apart from the lower and the upper limit value for the outlet pressure, preferably a maximal time duration for the operation of the booster pump without reaching the upper limit value is also stored in the memory of the control device. Hereby, the control device according to purpose is configured in a manner such that it switches off the booster pump after this maximal time duration, in a case, in which the maximal outlet pressure which can be reached on operation of the booster pump lies below the upper limit value. For this purpose, the control device favorably has a time switch which determines the point in time, at which the control device switches off the booster pump.

The invention is hereinafter explained in more detail by way of one embodiment example represented in the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the embodiment of the invention is illustrated.

DESCRIPTION OF THE PREFERRED EMBODIMENTS

Figure 1:
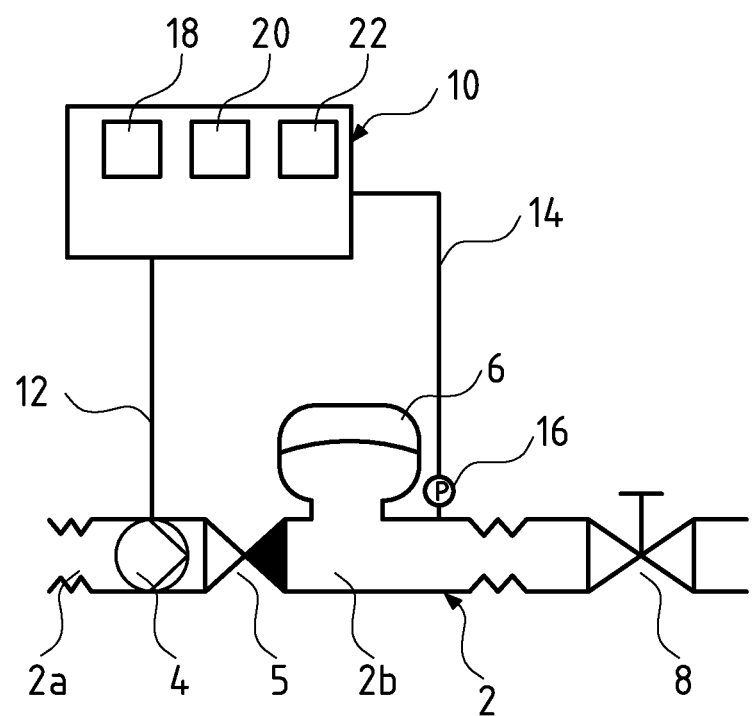
FIG. 1 is a schematic, simplified view of a pressure-boosting device according to the invention.

Referring to the drawings, a supply conduit 2, in which a booster pump 4 is integrated, is represented in FIG. 1. The booster pump 4 which is part of a pressure-boosting device, serves for delivering a fluid delivery medium led through the supply conduit 2, from a pressure level prevailing in a region 2a of the supply conduit 2, at the entry side of the booster pump 4, to a higher pressure level prevailing in a region 2b of the supply conduit 2, at the exit side of the booster pump 4. A check valve 5 and a storage tank 6 as well as a shut-off valve 8 is arranged on the supply conduit 2, at the exit side of the booster pump 4. It is to be noted that the storage tank 6 is not essential to the invention and can be omitted as the case may be. For example instead flexible pipes can exist in the system.

A control device 10 which via a lead 12 is signal-connected to the booster pump 4 is provided for the control of the booster pump 4. As is the case with the booster pump 4, the control device 10 is also part of a pressure-boosting device. The control device 10 is moreover signal-connected via a lead 14 to a pressure sensor 16 which detects the outlet pressure in the region of the supply conduit 2b and which prevails at the exit side of the booster pump 4. The essential components of the control device 10 are a memory 18, an adaptation module 20 as well as a computation module 22, the significance of which with be dealt with in more detail hereinafter.

The pressure-boosting device represented in FIG. 1 serves for maintaining an outlet pressure 24 in the region 2b of the supply conduit 2 by way of the booster pump 4, wherein this outlet pressure should lie between a lower limit value 26 and an upper limit value 28 and should not exceed the upper limit value 28. This actual situation is clear from the upper coordinate system in FIG. 2, in which the outlet pressure 24 is plotted against time 30. The lower limit value 26 (lower outlet pressure limit value 26) and the upper limit value 28 (upper outlet pressure limit value 28) for the outlet pressure 24 are stored in the memory 18 of the control device 10.

Normally, an outlet pressure 24 lying above the limit value 26 is realized by way of the control device 10 switching on the booster pump 4 when the outlet pressure 24 lies below the limit value 26, and switching it off when the outlet pressure 24 reaches the upper limit value 28. If now the outlet pressure 24 in the region 2b of the supply conduit 2 again falls to a value below the lower limit value 26 by way of opening the shut-off valve 8, then the control device 10 initiates the renewed switching-on of the booster pump 4.

An outlet pressure 24 above the lower limit value 26 however is only possible from a certain inlet pressure 32 of the booster pump 4 which prevails in the region 2a of the supply conduit 2. Such an inlet pressure 32b is to be deduced from the middle coordinate system of FIG. 2, in which a possible course of the inlet pressure 32 is plotted against time 30. The outlet pressure 24 cannot be increased to a value above the lower limit value 26 if the inlet pressure 32 lies below the value 32b, as is represented in the middle coordinate system of FIG. 2 by way of the value 32a. This situation is now explained by way of FIGS. 1 and 2.

Figure 2:
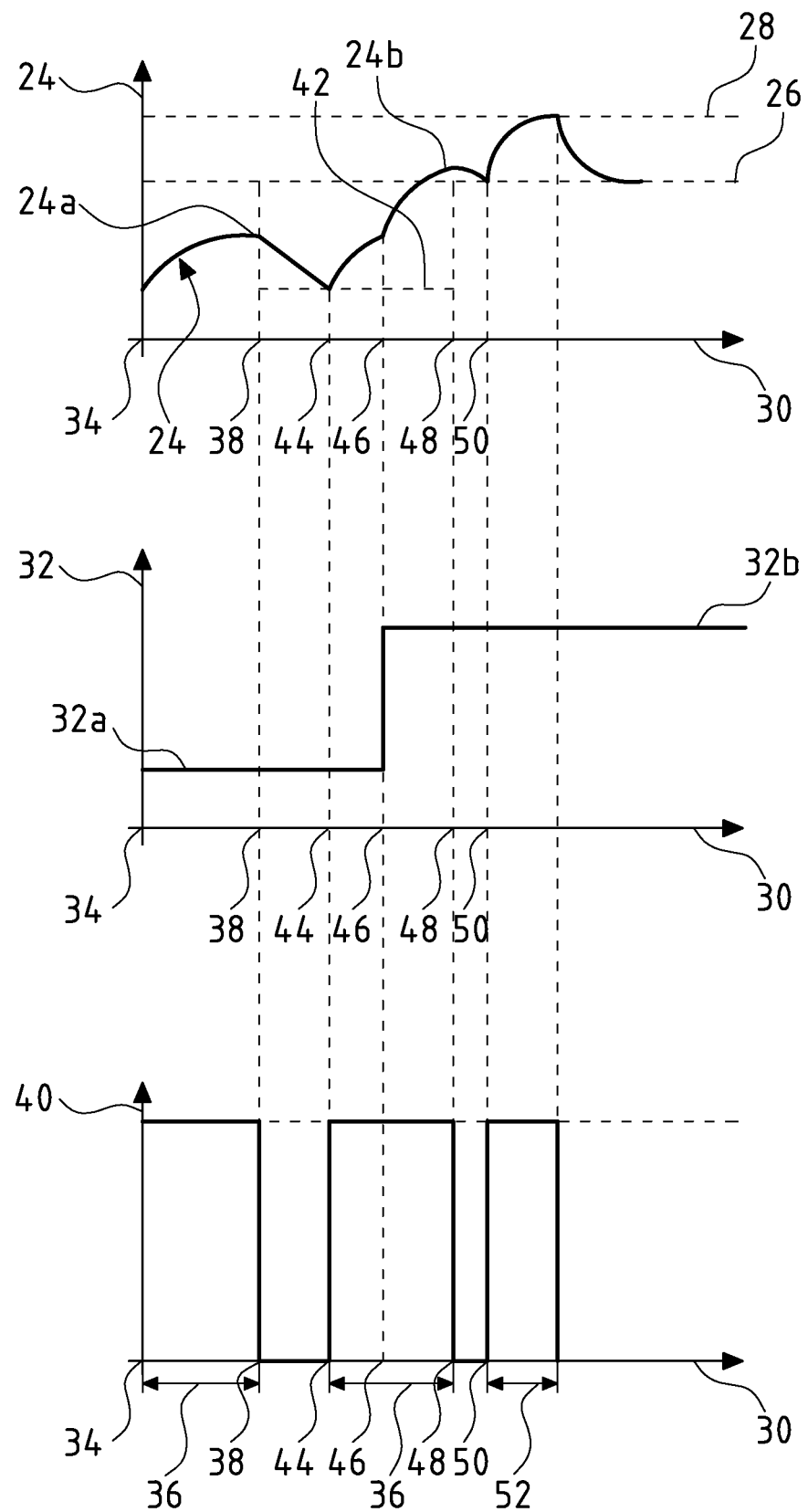
FIG. 2 is a diagram in three separate coordinate systems of the temporal course of the outlet and inlet pressure of a booster pump of the pressure-boosting device according to FIG. 1, as well as the switch-on duration of the booster pump.

As is represented in FIG. 2, the booster pump 4 is switched on by the control device 10 at a point in time 34. Hereby, the inlet pressure 32a prevails in the region 2a of the supply conduit 2, at the entry side of the booster pump 4. The booster pump 4 is now operated only for a set time interval 36 which is likewise stored in the memory 18 of the control device 10, and is switched off again after completion of the maximal time interval 36 at a point in time 38, since the upper limit value 28 is not reached. This is deduced from the lower coordinate system of FIG. 2, in which the switching-on 40 of the booster pump 4 is represented over time 30. The outlet pressure 24a which can be maximally achieved at the present inlet pressure 32a and which lies below the lower limit value 26 is computed in the computation module 22 of the control device 10 during the time interval 36. An outlet pressure 24 which lies between the limit values 26 and 28 thus cannot be presently realized. For this reason, the adaptation module 20 initiates a reduction of the lower limit value 26 to the limit value 42 (adapted lower outlet pressure limit value) which is lower than the current maximally achievable outlet pressure 24a. This new lower limit value 42 is now stored in the memory 18 of the control device 10.

The booster pump 4 thus remains switched off for so long, until the outlet pressure 24 has dropped to a new lower limit value 42. This is the case at the point in time 44. The booster pump 4 is switched-on again at this point in time 44 and remains in operation for a further maximal time interval 36, since the upper limit value 28 is again not reached. The inlet pressure 32 during this time interval 36, at a point in time 46 increases from a value 32a to the value 32b. The outlet pressure 24 can again increase to above the initial lower limit value 26 on account of this, so that an outlet pressure 24b which is computed beforehand by the computation module 22 results after the completion of the time interval 36 at a point in time 48.

The adaptation module 20 of the control device 10 now initiates the changing of the lower limit value 42 again to the initial lower limit value 26 and its storage, in the memory 18 of the control device 10. The booster pump 4 now remains switched off for so long, until the outlet pressure 24 has dropped to the lower limit value 26. This is the case at the point in time 50, at which the booster pump 4 is switched on again by the control device 10. After a time interval 52 which is shorter than the time interval 36 stored in the memory 18, the outlet pressure 24 reaches the upper limit value 28, so that the control device 10 then initiates the basically envisaged switching-off of the booster pump 4. The booster pump 4 remains switched off for so long until the outlet pressure 24 has dropped to the lower limit value 26. The booster pump 4 is switched on again by the control device 10, on reaching the lower limit value 26, wherein the previously described procedures then repeat themselves While specific embodiments of the invention have been shown and described in detail to illustrate the application of the principles of the invention, it will be understood that the invention may be embodied otherwise without departing from such principles.

APPENDIX

List of Reference Numerals 2 supply conduit 32a, 32b value, inlet pressure value
2a, 2b region 34 point in time
4 booster pump 36 maximal time interval
5 check valve 38 point in time
6 storage tank 40 switching-on
8 shut-off valve 42 limit value, adapted
10 control device lower pressure limit value
12 lead 44 point in time
14 lead 46 point in time
16 pressure sensor 48 point in time
18 memory 50 point in time
20 adaptation module 52 time interval
2 computation module
24, 24a, 24b outlet pressure
26 limit value, lower
  outlet pressure limit value
28 limit value, upper
  outlet pressure limit value
30 time
32 inlet pressure

What is claimed is:

1. A pump control method for controlling at least one booster pump, the method comprising the steps of:
   switching on the at least one booster pump when a booster pump outlet pressure drops to a lower limit value;
   switching off the at least one booster pump when the booster pump outlet pressure reaches an upper limit value;
   determining a maximal outlet pressure; the maximal outlet pressure being achievable based on operational conditions of the at least one booster pump during operation of the at least one booster pump;
   reducing the lower limit value to a new lower limit value when the maximal outlet pressure lies below the lower limit value, wherein the lower limit value is replaced by the new lower limit value;
   providing a memory unit, wherein the lower limit value is stored in the memory unit and the lower limit value is deleted and replaced by the new lower limit value in the memory unit, wherein the new lower limit value is greater than zero and less than the upper limit value, wherein the new lower limit value is lower than the maximal outlet pressure which can be reached on operation of the at least one booster pump, in the case that the maximal outlet pressure which can be reached on operation of the at least one booster pump lies below the lower limit value.

2. A pump control method according to claim 1, wherein the new lower limit value is lower by a predefined difference value than the maximal outlet pressure which can be reached on operation of the at least one booster pump, wherein the lower limit value is greater than zero and less than the upper limit value.

3. A pump control method according to claim 1, wherein the new lower limit value is reset to a predefined starting value when the maximal outlet pressure which can be reached on operation of the at least one booster pump lies above the predefined starting value.

4. A pump control method according to claim 3, wherein the maximal outlet pressure lies above the predefined starting value by a predefined difference.

5. A pump control method according to claim 1, wherein the new lower limit value is reset to the predefined starting value when the maximal outlet pressure which can be reached on operation of the at least one booster pump lies above the predefined starting value by a predefined difference.

6. A pump control method according to claim 1, wherein the at least one booster pump is switched off after a predefined time duration, in a case in which the maximal outlet pressure which can be reached on operation of the at least one booster pump lies below the upper limit value.

7. A pump control method according to claim 1, wherein the maximal outlet pressure, which can be reached on operation of the at least one booster pump, is determined by being detected or computed, the at least one booster pump being a centrifugal pump.

8. A pressure-boosting device comprising:
at least one booster pump;
a control device comprising a memory with an upper limit value stored therein and with a lower limit value stored therein, said control device controlling the at least one booster pump including switching on the at least one booster pump when a booster pump outlet pressure drops to the lower limit value and switching off the at least one booster pump when the booster pump outlet pressure reaches the upper limit value, the control device being configured to determine a maximal outlet pressure, the maximal outlet pressure being achievable based on operational conditions of the at least one booster pump during operation of the at least one booster pump, the control device further comprising an adaptation module for adapting the lower limit value, said adaptation module being configured to reduce the lower limit value and store the reduced lower limit value in the memory upon a determination that the maximal outlet pressure lies below the lower limit value, wherein the reduced lower limit value overwrites the lower limit value and the reduced lower limit value is stored in the memory upon the determination that the maximal outlet pressure is less than the lower limit value, the reduced lower limit value being greater than zero and less than the upper limit value.

9. A pressure-boosting device according to claim 8, wherein the control device further comprises a computation module configured to compute the maximal outlet pressure which can be reached on operation of the at least one booster pump.

10. A pressure-boosting device according to claim 8, further comprising at least one pressure sensor arranged at an exit side of the at least one booster pump, wherein the at least one pressure sensor detects the outlet pressure and is signal-connected to the control device, the at least one booster pump being a centrifugal pump.

11. A pressure-boosting device according to claim 8, wherein the adaptation module is configured to reduce the lower limit value to a value lower than an achievable maximal outlet pressure upon the maximal outlet pressure which can be reached on operation of the at least one booster pump lying below the lower limit value.

12. A pressure-boosting device according to claim 2, wherein predefined starting value is stored in the memory of the control device and the adaptation module is configured to reset the reduced lower limit value to the predefined starting value and store it as a reset lower limit value when the maximal outlet pressure which can be reached on operation of the at least one booster pump lies above the predefined starting value.

13. A pressure-boosting device according to claim 8, wherein a predefined starting value is stored in the memory of the control device and the adaptation module is configured to reset the reduced lower limit value to the predefined starting value and store it as a reset lower limit value when the maximal outlet pressure which can be reached on operation of the at least one booster pump lies above the predefined starting value by a predefined difference.

14. A pressure-boosting device according to claim 8, wherein a maximal time duration for the operation of the at least one booster pump without reaching the upper limit value is stored in the memory of the control device, and the control device is configured to switch off the at least one booster pump after the maximal time duration when the maximal outlet pressure which can be reached on operation of the at least one booster pump lies below the upper limit value.

15. A pressure-boosting device comprising:
a booster pump;
a control device comprising a memory with an upper limit value stored therein and with a lower limit value stored therein, the control device being configured to:
control the booster pump including switching on the booster pump when a booster pump outlet pressure drops to the lower limit value and switching off the booster pump when the booster pump outlet pressure reaches the upper limit value;
determine a maximal outlet pressure of the booster pump, the maximal outlet pressure being achievable based on operational conditions of the booster pump during operation of the at least one booster pump;
replace the lower limit value with another lower limit value when the maximal outlet pressure is less than the lower limit value, wherein the another lower limit value is greater than zero and less than the lower limit value and the maximal outlet pressure, wherein the another lower limit value overwrites the lower limit value stored in the memory.

16. A pressure-boosting device according to claim 15, further comprising at least one pressure sensor arranged at an exit side of the booster pump, wherein the at least one pressure sensor detects the outlet pressure and is signal-connected to the control device, the booster pump being a centrifugal pump.

17. A pressure-boosting device according to claim 15, wherein the control device is further configured to reset the another lower limit value to a predefined starting value stored in the memory of the control device and to store the reset lower limit value when the maximal outlet pressure which can be reached on operation of the booster pump lies above the predefined starting value.

18. A pressure-boosting device according to claim 15, wherein the control device is further configured to reset the another lower limit value to a predefined starting value stored in the memory of the control device and to store the reset lower limit value when the maximal outlet pressure which can be reached on operation of the at least one booster pump lies above the predefined starting value by a predefined difference.

* * * * *